Patented Feb. 17, 1948

2,435,992

UNITED STATES PATENT OFFICE 2,435,992

PRINTING INK COMPOSITION

Herbert J. Wolfe, Maspeth, and Paul W. Greubel, Long Island City, N. Y., assignors to American Can Company, New York, N. Y., a corporation of New Jersey No Drawing. Application July 27, 1945, Serial No. 607,506

2 Claims. (Cl. 106—26)

Our invention relates generally to printing inks and more particularly to a fast drying, heat setting and heat jelling printing ink composition which employs a novel pigment carrying vehicle comprising a cellulose compound, preferably ethyl cellulose, and a solvent and wetting agent which has a number of unique properties, i. e., octyl alcohol, chemically known as 2-ethylhexone or 2-ethylhexyl alcohol.

In our search for a suitable quick drying, heat setting ink especially adapted for printing on fibre milk container blanks by means of the well known Chambon type printing press, which prints container blanks at high speed (300 feet per minute and over) and hence has a greatly restricted available heating time and space, we investigated and experimented with practically all known types of printing inks, such as standard heat set inks composed of resin, petroleum or spirit solvents and pigments, water and steam set inks and ordinary oleo-resinous inks, without satisfactory results. These well known prior inks lack one or more essential properties. For example, the standard heat set inks produce sticky or tacky and partially dried printed surfaces which cause off-setting or smudging, present water or steam set inks do not dry with sufficient rapidity and are adversely affected during the printing operation by humidity in the atmosphere, while ordinary pigmented oleo-resinous printing inks are too slow in drying, resulting in off-setting or smudging when the printed sheets are stacked at the end of the press. Also, some of these old types of inks contain solvents which produce an objectionable odor resulting in off-taste for the product packed in containers made from such printed blanks.

After extensive research and tests we finally discovered and successfully produced a fast drying, heat set and heat jelling printing ink which uniformly overcomes all the undesirable characteristics of prior inks and which has surprisingly advantageous results especially when applied to the printing of paper or fibre food containers or cartons, such for example the fibre milk container disclosed in Hothersall Patent No. 2,085,979, which is produced on high speed machines in large quantities. These high speed container making machines require high speed synchronization of the printing machine unit included in a complete line of machines. We found, however, that our improved printing ink is also satisfactory for printing on plastic sheets, rubber sheets, regenerated cellulose, parchment, glassine paper, metal foils, etc.

A principal object of our invention is the provision of a fast drying, heat setting and heat jelling printing ink which is especially adapted for printing on fibre or paper stock or similar web material which is used in the manufacture of containers.

Another important object of our invention is the provision of such an ink which contains as the essential vehicle ingredients, ethyl cellulose and octyl alcohol, which when combined with a suitable pigment is stable at ordinary room temperatures, but when heated dries quickly by evaporation and leaves a clean, clear, sharp, gel-like, non-tacky and non-smudging imprint. Our printing ink is also non-hygroscopic, i. e., it remains substantially unaffected by high humidity in the atmosphere. It is free to a remarkable degree of the usual printing ink odors, which renders it especially suitable for printing on fibre food containers or cartons.

Numerous other objects and advantages of the invention will be apparent as it is better understood from the following description which is of a preferred embodiment thereof.

The principal or essential ingredients of the novel fast drying ink of our invention are a cellulose compound as a base, such as ethyl cellulose, nitro-cellulose, etc. We prefer ethyl cellulose over nitro-cellulose because the former can be transported and handled with greater safety and is more stable on exposure to light and in aging. Ethyl cellulose can be shipped in dry form, whereas nitro-cellulose must be wet with 30% of ethyl alcohol before it may be shipped and handled due to its great fire hazard. Also the alcohol used in wetting nitro-cellulose has a deleterious effect on some of the inks made therefrom.

We also made the discovery, after testing a great number of other solvents, that octyl alcohol, chemically known as 2-ethylhexyl alcohol, possessed excellent compatibility with the ethyl cellulose base and with nearly all of the pigments and mixtures of coloring materials.

Octyl alcohol (2-ethylhexyl alcohol) is a slow evaporating liquid solvent and wetting agent of slight but pleasant odor, is water white and in its commercial form has a purity of 99%. It has a boiling point range of 183 degrees to 201 degrees centigrade, a molecular weight of 130.14 and a specific gravity of 0.834 at 20 degrees C. At 20 degrees C. it has a vapor pressure of 0.36 millimeter of mercury and at 150 degrees C. its vapor pressure is 259 millimeters of mercury.

We found that when we used octyl alcohol as a solvent we obtained not only better compatability with the ethyl cellulose and pigments, but this vehicle combination produced a printing ink which dried in one-tenth of a second when the wet ink imprint was passed beneath the flame of a single Kemp high pressure gas burner, which occupied only about a foot of space on the printing press bed plate. The printing was sharp and clear and there was no evidence of off-setting or smudging when the sheets printed with our ink were stacked upon each other at the end of the printing press. This means that sheets or blanks printed with our ink may be used or further operated upon immediately after coming off the press instead of having to stand idle for several hours to become dry, as when ordinary oleo-resinous printing inks are employed. We also made the discovery that sheets or blanks printed with our ink after drying leave no odor of printing ink, due to the substantially odorless property of octyl alcohol solvent employed. This is another important advantage especially when printed blanks are used in the manufacture of containers for food products, such as milk, cream, butter, cooking fats and other food products which have a tendency to absorb extraneous odors.

We also discovered that a fairly wide range of proportions within critical limits of ethyl cellulose and octyl alcohol solvent may be employed. We have fixed the critical range of proportions for the ethyl cellulose ingredient at between 5 to 30 percent and that of the octyl alcohol between 40 to 60 percent by weight of the finished ink composition. The range of percentages was found to be critical at these points, since an ink containing less than 5 percent of ethyl cellulose as the sole binder was found to have insufficient body or binding properties to be satisfactory, while an ink containing over 30 percent of ethyl cellulose was found to be too heavy in consistency to distribute properly over the printing machine rollers. We also found that our improved printing ink had no deleterious effect on either natural rubber or synthetic rubber printing rollers.

The following formulae are examples of the critical range of proportions of the vehicle ingredients of our ink composition:

*Example 1*

|  | Pounds | Percentage by Weight |
|---|---|---|
| Ethyl Cellulose | 5 | 5 |
| Octyl Alcohol | 45 | 45 |
| Lithol Toner Red Pigment | 50 | 50 |
|  | 100 | 100 |

*Example 2*

|  | Pounds | Percentage by Weight |
|---|---|---|
| Ethyl Cellulose 10 cps | 12 | 12 |
| Octyl Alcohol | 58 | 58 |
| Carbon Black Pigment | 15 | 15 |
| Iron Blue Pigment | 15 | 15 |
|  | 100 | 100 |

*Example 3*

|  | Pounds | Percentage by Weight |
|---|---|---|
| Ethyl Cellulose 10 cps | 30 | 30 |
| Octyl Alcohol | 40 | 40 |
| Molybdate Orange Pigment | 29 | 29 |
| Beeswax (optional) | 1 | 1 |
|  | 100 | 100 |

The beeswax in Example #3 is preferably included to improve press stability of the ink, since with this higher percentage of ethyl cellulose the ink would have a tendency to dry up on the press.

The varying percentages of ethyl cellulose and octyl alcohol are desirable to produce vehicles having a fairly wide range of viscosities to permit selection of pigments having different specific gravities and other physical properties. In other words pigments having high specific gravities require more viscous vehicles than pigments of low specific gravities.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

1. A printing ink composition which is substantially non-drying at ordinary temperatures and dries instantly on heating of the printed matter by evaporation resulting in gelation without passing through the stage of tackiness, consisting of coloring matter dispersed in an organic viscous vehicle consisting of from 5 to 30 percent by weight of ethyl cellulose and from 40 to 60 percent by weight of 2-ethylhexyl alcohol, said composition being further characterized by being substantially non-hygroscopic while on the printing press and odorless after drying.

2. A quick drying printing ink composition for application to web material used in the manufacture of containers, in combination a vehicle consisting of a cellulose compound of the class consisting of ethyl cellulose and nitro cellulose and 2-ethylhexyl alcohol as a solvent and wetting agent in proportions by weight of the finished composition of from 5 to 30 percent of the cellulose compound and from 40 to 60 percent of the solvent and a color pigment incorporated in said vehicle, said composition being further characterized by being substantially non-hygroscopic while on the printing press and odorless after drying, thereby protecting container contents against odor or off-flavor.

HERBERT J. WOLFE.
PAUL W. GREUBEL.

REFERENCES CITED

The following references are of record in the file of this patent:

UNITED STATES PATENTS

| Number | Name | Date |
|---|---|---|
| 2,087,190 | Gessler | July 13, 1937 |

OTHER REFERENCES

"Handbook of Plastics," Simonds and Field, pages 242 and 253.

"Handbook of Plastics," Simmonds et al., D. Van Nostrand Co., Inc., New York, 1943, pages 248–249.